(12) United States Patent
Oyadomari et al.

(10) Patent No.: US 8,032,916 B2
(45) Date of Patent: Oct. 4, 2011

(54) SINGLE MASTER CLOCK CONTROL OF ETHERNET DATA TRANSFER OVER BOTH A CABLE TV RETURN PATH AND AN ETHERNET FORWARD PATH

(75) Inventors: Randy Ichiro Oyadomari, San Jose, CA (US); Arthur Michael Lawson, Morgan Hill, CA (US); Stephen Charles Gordy, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 1317 days.

(21) Appl. No.: 10/909,478

(22) Filed: Aug. 2, 2004

(65) Prior Publication Data
US 2005/0273837 A1    Dec. 8, 2005

Related U.S. Application Data

(60) Provisional application No. 60/570,892, filed on May 12, 2004.

(51) Int. Cl.
| H04N 7/173 | (2011.01) |
| H04L 5/14 | (2006.01) |
| H04L 12/28 | (2006.01) |
| H04L 12/56 | (2006.01) |
| H04L 7/00 | (2006.01) |
| H04L 7/06 | (2006.01) |
| H04J 3/06 | (2006.01) |
| H04J 3/04 | (2006.01) |
| H04J 3/02 | (2006.01) |

(52) U.S. Cl. .......... 725/119; 370/294; 370/395.62; 370/503; 370/518; 370/535; 370/537; 375/355; 375/356; 375/358; 375/364

(58) Field of Classification Search ............ 725/119, 725/105
See application file for complete search history.

(56) References Cited

U.S. PATENT DOCUMENTS
4,513,426 A   4/1985   Jayant
(Continued)

FOREIGN PATENT DOCUMENTS
WO   WO 0025459   5/2000
(Continued)

OTHER PUBLICATIONS
United States Patent and Trademark Office, U.S. Appl. No. 10/845,006, Non-Final Rejection mailed Jun. 24, 2008.
(Continued)

*Primary Examiner* — Andrew Koenig
*Assistant Examiner* — Mark Featherstone
(74) *Attorney, Agent, or Firm* — Maschoff Gilmore & Israelsen

(57) ABSTRACT

An optical signal return path system analog RF signals are sampled using a master clock frequency, and combined with digital data such as Ethernet data at a cable node. The cable node sends the combined signals on a return path over a fiber optic medium to the cable hub. The cable hub extracts an approximate in-frequency replicate of a master clock signal, and can use the replicate master clock signal to desample the digitized RF signals back to analog. The cable hub can further use the replicate of the master clock signal to serialize Ethernet data, and send the Ethernet data back to the cable node via an optical cable in the forward direction. Accordingly, a single master clock signal can be used on a CATV network for encoding/decoding, and transmitting a variety of data signals, which enhances the integrity and reliability of the data signals.

22 Claims, 7 Drawing Sheets

U.S. PATENT DOCUMENTS

| | | | |
|---|---|---|---|
| 4,809,271 | A | 2/1989 | Kondo et al. |
| 4,862,392 | A | 8/1989 | Steiner |
| 4,918,446 | A | 4/1990 | Yagi |
| 5,014,309 | A | 5/1991 | West, Jr. |
| 5,036,315 | A | 7/1991 | Gurley |
| 5,070,402 | A | 12/1991 | Ishii et al. |
| 5,113,189 | A | 5/1992 | Messer et al. |
| 5,142,690 | A | 8/1992 | McMullan, Jr. et al. |
| 5,155,590 | A | 10/1992 | Beyers, II et al. |
| 5,208,854 | A | 5/1993 | West, Jr. |
| 5,225,902 | A | 7/1993 | McMullan, Jr. |
| 5,235,619 | A | 8/1993 | Beyers, II et al. |
| 5,243,651 | A | 9/1993 | Parikh et al. |
| 5,245,420 | A | 9/1993 | Harney et al. |
| 5,247,364 | A | 9/1993 | Banker et al. |
| 5,251,324 | A | 10/1993 | McMullan, Jr. |
| 5,255,086 | A | 10/1993 | McMullan, Jr. et al. |
| 5,301,028 | A | 4/1994 | Banker et al. |
| 5,303,295 | A | 4/1994 | West et al. |
| 5,313,467 | A | 5/1994 | Varghese et al. |
| 5,317,391 | A | 5/1994 | Banker et al. |
| 5,319,454 | A | 6/1994 | Schutte |
| 5,323,462 | A | 6/1994 | Farmer |
| 5,357,276 | A | 10/1994 | Banker et al. |
| 5,430,568 | A | 7/1995 | Little et al. |
| 5,442,472 | A | 8/1995 | Skrobko |
| 5,481,542 | A | 1/1996 | Logston et al. |
| 5,497,187 | A | 3/1996 | Banker et al. |
| 5,499,241 | A | 3/1996 | Thompson et al. |
| 5,505,901 | A | 4/1996 | Harney et al. |
| 5,539,822 | A | 7/1996 | Lett |
| 5,581,555 | A | 12/1996 | Dubberly et al. |
| 5,594,726 | A | 1/1997 | Thompson et al. |
| 5,680,394 | A * | 10/1997 | Bingham et al. ............. 370/294 |
| 5,684,799 | A | 11/1997 | Bigham et al. |
| 5,719,867 | A | 2/1998 | Borazjani |
| 5,719,872 | A | 2/1998 | Dubberly et al. |
| 5,794,117 | A | 8/1998 | Benard |
| 5,826,167 | A | 10/1998 | Jelinek et al. |
| 5,844,706 | A | 12/1998 | Kohn et al. |
| 5,854,703 | A | 12/1998 | West, Jr. |
| 5,854,830 | A | 12/1998 | Kenmochi |
| 5,864,560 | A | 1/1999 | Li et al. |
| 5,907,363 | A | 5/1999 | Botsford, III et al. |
| 5,926,478 | A | 7/1999 | Ghaibeh et al. |
| 5,930,231 | A | 7/1999 | Miller et al. |
| 5,963,352 | A | 10/1999 | Atlas et al. |
| 6,041,056 | A | 3/2000 | Bigham et al. |
| 6,041,066 | A * | 3/2000 | Meki et al. ............. 370/512 |
| 6,161,011 | A | 12/2000 | Loveless |
| 6,175,861 | B1 | 1/2001 | Williams, Jr. et al. |
| 6,178,446 | B1 | 1/2001 | Gerszberg et al. |
| 6,249,528 | B1 * | 6/2001 | Kothary ............. 370/466 |
| 6,272,150 | B1 | 8/2001 | Hrastar et al. |
| 6,356,369 | B1 | 3/2002 | Farhan |
| 6,356,374 | B1 | 3/2002 | Farhan |
| 6,373,611 | B1 | 4/2002 | Farhan et al. |
| 6,389,075 | B2 | 5/2002 | Wang et al. |
| 6,417,949 | B1 | 7/2002 | Farhan et al. |
| 6,433,906 | B1 | 8/2002 | Farhan |
| 6,437,895 | B1 | 8/2002 | Farhan et al. |
| 6,449,071 | B1 | 9/2002 | Farhan et al. |
| 6,457,178 | B1 | 9/2002 | Slim |
| 6,462,851 | B1 | 10/2002 | West, Jr. |
| 6,493,005 | B1 | 12/2002 | Wu |
| 6,505,271 | B1 | 1/2003 | Lien et al. |
| 6,519,067 | B2 | 2/2003 | Farhan et al. |
| 6,523,177 | B1 | 2/2003 | Brown |
| 6,535,715 | B2 | 3/2003 | Dapper et al. |
| 6,622,281 | B1 | 9/2003 | Yun et al. |
| 6,625,166 | B2 | 9/2003 | Tsukamoto et al. |
| 6,751,269 | B1 | 6/2004 | Shalvi et al. |
| 6,754,221 | B1 | 6/2004 | Whitcher et al. |
| 6,798,790 | B1 * | 9/2004 | Enssle et al. ............. 370/503 |
| 6,831,901 | B2 | 12/2004 | Millar |
| 7,000,018 | B1 | 2/2006 | Begis |
| 7,131,024 | B1 * | 10/2006 | Venkata et al. ............. 713/500 |
| 7,222,358 | B2 | 5/2007 | Levinson et al. |
| 7,257,328 | B2 | 8/2007 | Levinson et al. |
| 7,519,078 | B2 | 4/2009 | Oyadomari et al. |
| 2002/0073434 | A1 | 6/2002 | Pience |
| 2002/0085589 | A1 * | 7/2002 | Dravida et al. ............. 370/503 |
| 2002/0129379 | A1 | 9/2002 | Levinson et al. |
| 2002/0131426 | A1 | 9/2002 | Amit et al. |
| 2003/0035445 | A1 | 2/2003 | Choi |
| 2005/0039103 | A1 | 2/2005 | Azenko et al. |
| 2006/0013194 | A1 | 1/2006 | Baumann et al. |

FOREIGN PATENT DOCUMENTS

| | | |
|---|---|---|
| WO | WO 0143441 | 6/2001 |
| WO | WO 0152455 | 7/2001 |

OTHER PUBLICATIONS

United States Patent and Trademark Office, U.S. Appl. No. 10/845,006, Final Rejection mailed Dec. 23, 2008.

United States Patent and Trademark Office, U.S. Appl. No. 10/845,006, Non-Final Rejection mailed Aug. 7, 2009.

United States Patent and Trademark Office, U.S. Appl. No. 09/735,710, Non-Final Rejection mailed Dec. 28, 2005.

United States Patent and Trademark Office, U.S. Appl. No. 09/735,710, Non-Final Rejection mailed Jun. 2, 2006.

United States Patent and Trademark Office, U.S. Appl. No. 09/735,710, Final Rejection mailed Oct. 30, 2006.

United States Patent and Trademark Office, U.S. Appl. No. 09/735,710, Notice of Allowance mailed Apr. 9, 2007.

United States Patent and Trademark Office, U.S. Appl. No. 10/285,205, Non-Final Rejection mailed Jan. 6, 2006.

United States Patent and Trademark Office, U.S. Appl. No. 10/285,205, Final Rejection mailed Jul. 25, 2006.

United States Patent and Trademark Office, U.S. Appl. No. 10/285,205, Notice of Allowance mailed Jan. 22, 2007.

United States Patent and Trademark Office, U.S. Appl. No. 10/845,202, Non-Final Rejection mailed Apr. 4, 2008.

United States Patent and Trademark Office, U.S. Appl. No. 10/845,202, Notice of Allowance mailed Dec. 5, 2008.

United States Patent and Trademark Office, U.S. Appl. No. 10/102,619, Non-Final Rejection mailed Apr. 29, 2008.

United States Patent and Trademark Office, U.S. Appl. No. 10/102,619, Final Rejection mailed Dec. 8, 2008.

United States Patent and Trademark Office, U.S. Appl. No. 10/102,619, Non-Final Rejection mailed Jul. 24, 2009.

United States Patent and Trademark Office, U.S. Appl. No. 10/291,208, Non-Final Rejection mailed Jul. 22, 2008.

United States Patent and Trademark Office, U.S. Appl. No. 10/291,208, Non-Final Rejection mailed May 27, 2009.

United States Patent and Trademark Office, U.S. Appl. No. 10/102,625, Non-Final Rejection mailed Jun. 16, 2008.

United States Patent and Trademark Office, U.S. Appl. No. 10/102,625, Non-Final Rejection mailed Jan. 6, 2008.

* cited by examiner

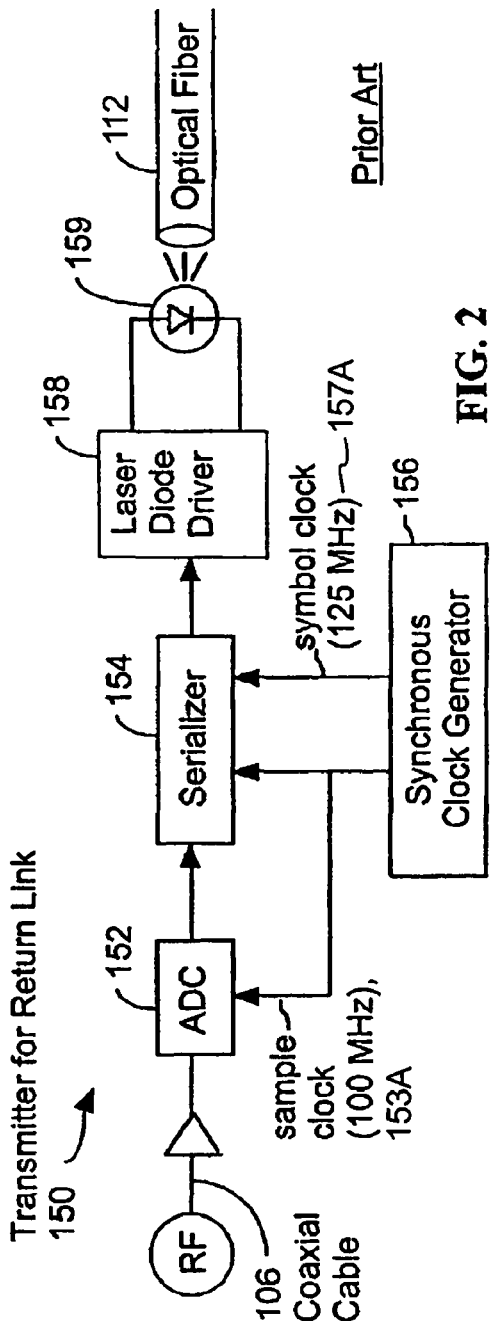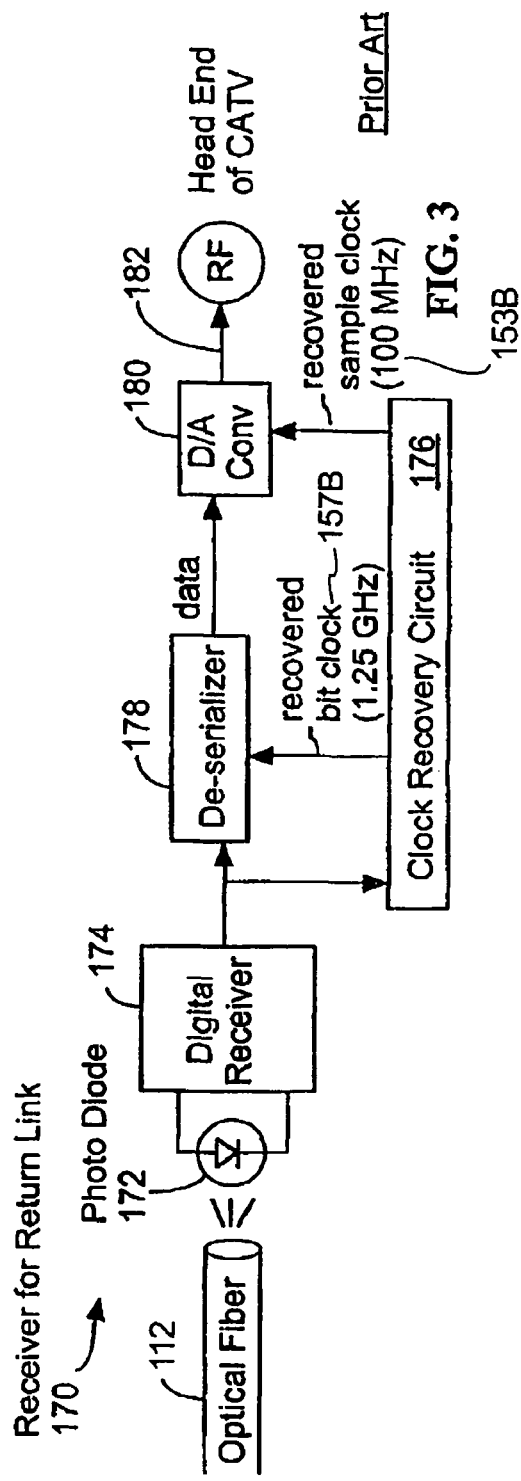

SINGLE MASTER CLOCK CONTROL OF ETHERNET DATA TRANSFER OVER BOTH A CABLE TV RETURN PATH AND AN ETHERNET FORWARD PATH

CROSS REFERENCE TO RELATED APPLICATIONS

The present invention claims the benefit of priority to U.S. Provisional Patent Application No. 60/570,892, filed May 12, 2004, and entitled "SINGLE MASTER CLOCK CONTROL OF ETHERNET DATA TRANSFER OVER BOTH A CABLE TV RETURN PATH AND AN ETHERNET FORWARD PATH", which is incorporated herein by reference.

BACKGROUND OF THE INVENTION

1. The Field of the Invention

The present invention relates generally to upstream data communications over networks primarily designed for downstream transmission of television and data signals, and particularly to a system and method for converting, transmitting, and regenerating one or more data signals based on a single master clock.

2. Background and Relevant Art

Cable television systems (CATV) were initially deployed so that remotely located communities were allowed to place a receiver on a hilltop and then use coaxial cable and amplifiers to distribute received signals down to the town which otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path". A good review of much of today's existing return path technology is contained in the book entitled *Return Systems for Hybrid Fiber Coax Cable TV Networks* by Donald Raskin and Dean Stoneback, hereby incorporated by reference as background information.

One additional innovation has become pervasive throughout the CATV industry over the past 10 years—the introduction of analog optical fiber transmitters and receivers operating over single mode optical fiber. These optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to distribute signals from the neighborhood nodes to homes, businesses and the like in a small geographical area. Return path optical fibers are typically located in the same cable as the forward path optical fibers so that return signals can have the same advantages as the forward path.

FIG. 1 is a block diagram of a prior art cable television system 100 that uses conventional analog return path optical fiber links. Each subtree 102 on the system comprises a coaxial cable 106 that is coupled to a cable modem 108, each cable modem 108 being used by subscribers for Internet access. The coaxial cable 106 is also coupled to set top boxes (not shown) and other equipment (not shown), which are not relevant to the present discussion. The coaxial cable 106 of each subtree 102 is further coupled to at least one forward path optical fiber 110 and at least one return path optical fiber 112, typically through a cable node. An analog optoelectronic transceiver 114 (typically at the cable node) provides the data path coupling the coaxial cable 106 to the optical fibers 110, 112.

An RF input signal, having an associated signal level, is submitted to a', transmitter portion of the optoelectronic transceiver 114, which in turn gains or attenuates the signal level, as appropriate. The RF input signal is then amplitude-modulated, and converted into a corresponding optical signal by a laser diode 122. Both Fabre-Perot (FP) and distributed feedback (DFB) lasers are typically used for this application. DFB lasers are used in conjunction with an optical isolator, and have improved signal to noise over FP lasers, but at a sacrifice of substantial cost. DFB lasers are preferred, as the improved SNR allows for better system performance when aggregating multiple returns.

The optical signal from the laser diode 122 is coupled to a single mode optical fiber (i.e., the return path optical fiber 112) that carries the signal to an optical receiver 130 typically located at a cable hub 350 (see FIGS. 7 and 8), such as a cable hub 350 at the head end system 132. The optical receiver 130 converts the amplitude-modulated light signal back to an RF signal. Sometimes a manual output amplitude adjustment mechanism is provided to adjust the signal level of the output produced by the optical receiver. A cable modem termination system (CMTS) 134 at the head end 132 receives and demodulates the recovered RF signals so as to recover the return path data signals sent by the subscribers.

FIGS. 2 and 3 depict the transmitter 150 and receiver 170 of a prior art return path link. The transmitter 150 (e.g., a cable node) digitizes the RF signal received from the coaxial cable 106, using an analog to digital converter (ADC) 152. The ADC 152 generates a ten-bit sample value for each cycle of the receiver's sample clock 153A, which is generated by a local, low noise clock generator 156. The output from the ADC 152 is converted by a serializer 154 into a serial data stream. The serializer 154 encodes the data using a standard 8B/10B mapping (i.e., a bit-value-balancing mapping), which increases the amount of data to be transmitted by twenty-five percent. This encoding is not tied to the 10-bit boundaries of the sample values, but rather is tied to the boundary of each set of eight samples (80 bits), which are encoded using 100 bits.

When the sample clock operates at a rate of 100 MHz, the output section of the serializer 154 is driven by a 125 MHz clock 157A, and outputs data bits to a fiber optic transmitter 158, 159 at a rate of 1.25 Gb/s. The fiber optic transmitter 158, 159 converts electrical 1 and 0 bits into optical 1 and 0 bits, which are then transmitted over an optical fiber 112. The fiber optic transmitter includes a laser diode driver 158 and a laser diode 159.

The receiver 170 at the receive end of the optical fiber 112 (e.g., a cable hub) includes a fiber receiver 172, 174 that receives the optical 1 and 0 bits transmitted over the optical fiber 112, and converts them into corresponding electrical 1 and 0 bits. This serial bit stream is conveyed to a deserializer circuit 178. A clock recovery circuit 176 recovers a 1.25 GHz bit clock from the incoming data and also generates a 100 MHz clock that is synchronized with the recovered 1.25 GHz bit clock.

The recovered 1.25 GHz bit clock is used by the deserializer 178 to clock in the received data, and the 100 MHz clock is used to drive a digital to analog converter 180, which converts ten-bit data values into analog voltage signals at the head end system. As a result, the RF signal from the coaxial cable 106 is regenerated at point 182 of the head end system.

Prior art return path link systems, such as the one shown in FIGS. 2 and 3, have used a low noise oscillator at the transmitter for the A/D sample clock 152. The same oscillator is also used as a reference for a synthesizer that generates a coherent symbol clock 157A for the communications link. The receiver 170 recovers the symbol clock 157B (e.g., via clock recovery circuit 176).

Time jitter is introduced in the receiver sample clock (e.g., via circuit 176) by the described communications path. The receiver's clock recovery circuit must react quickly to maintain lock on the received data. Accordingly, an advantage in the art can be realized with systems that maintain a consistent, approximate in-frequency replicate of a master clock rate in the return paths. Furthermore, in some cases, it may be desirable to transmit data other than television programming in a forward path as well. Such forward path data must also be properly synchronized. As there can be jitter introduced in both the return and forward paths, it would be advantageous to have a clocking mechanism that was reliable in both the return and forward data paths of the CATV network. It would further be desirable if the clock mechanism was of low complexity.

BRIEF SUMMARY OF THE INVENTION

The present invention solves one or more of the foregoing problems in the prior art with a cable distribution network capable of transferring RF and Ethernet data over both a return path and a forward path using a single master clock. In particular, an exemplary cable distribution network environment comprises a cable node and a cable hub, each having components configured to synchronize data transfers over both the return path and the forward path using the single master clock.

In at least one exemplary implementation, a master clock at the cable node samples RF data with a single master clock as the RF data arrive over coaxial cable. The cable node further receives Ethernet data, and combines the digital Ethernet data with the digitized (sampled) RF data. The cable node then transmits the combined RF data and Ethernet data along with clock information to the cable hub in a data stream. In at least one exemplary implementation, the data stream can be serialized by a second clock rate prior to transmission from the cable node to the cable hub.

The cable hub extracts the clock information from the transmitted data stream and recovers an approximate, in-frequency replicate of the master clock signal. The cable hub uses the replicated master clock signal to de-sample (recover) the RF data from the transmitted data stream. In one exemplary implementation, the cable hub can also use the replicated master clock signal to serialize other Ethernet data, and transmit the serialized Ethernet data back along the forward path, or the path to the cable node.

Accordingly, exemplary implementations of the present invention provide in-frequency control of all forward and return pathways of the exemplary cable network using a single clock. This can simplify and otherwise improve the reliability of data communication timing.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2 and 3 are block diagrams of the transmitter and receiver, respectively, of a prior art digital return path link system;

DETAILED DESCRIPTION OF THE INVENTION

The present invention solves one or more of the foregoing problems in the prior art with a cable distribution network capable of transferring RF and Ethernet data over both a return path and a forward path using a single master clock. In particular, an exemplary cable distribution network environment comprises a cable node and a cable hub, each having components configured to synchronize data transfers over both the return path and the forward path using the single master clock.

Figure 1:
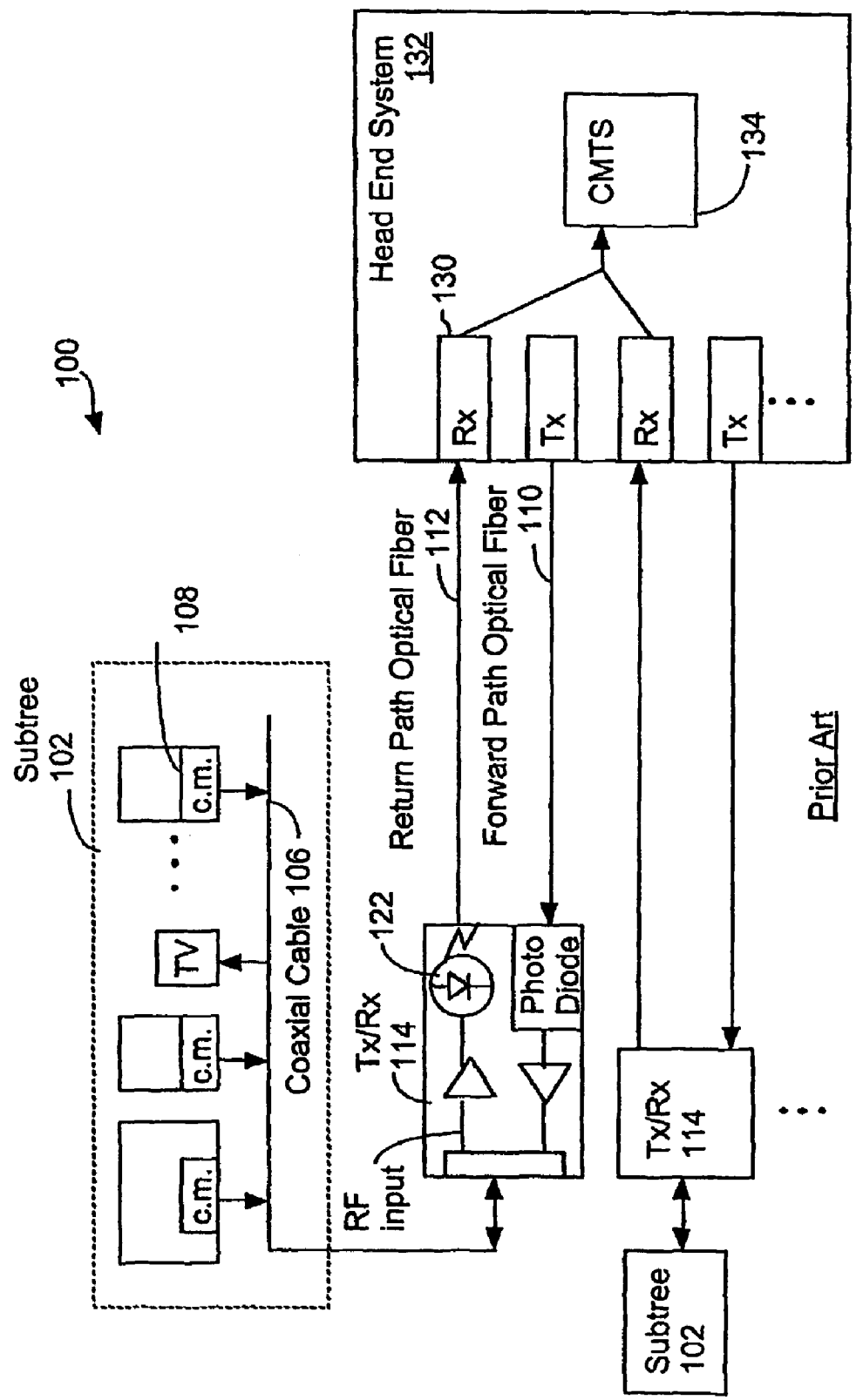
FIG. 1 is a block diagram of a prior art analog return path link system.
Figure 4:
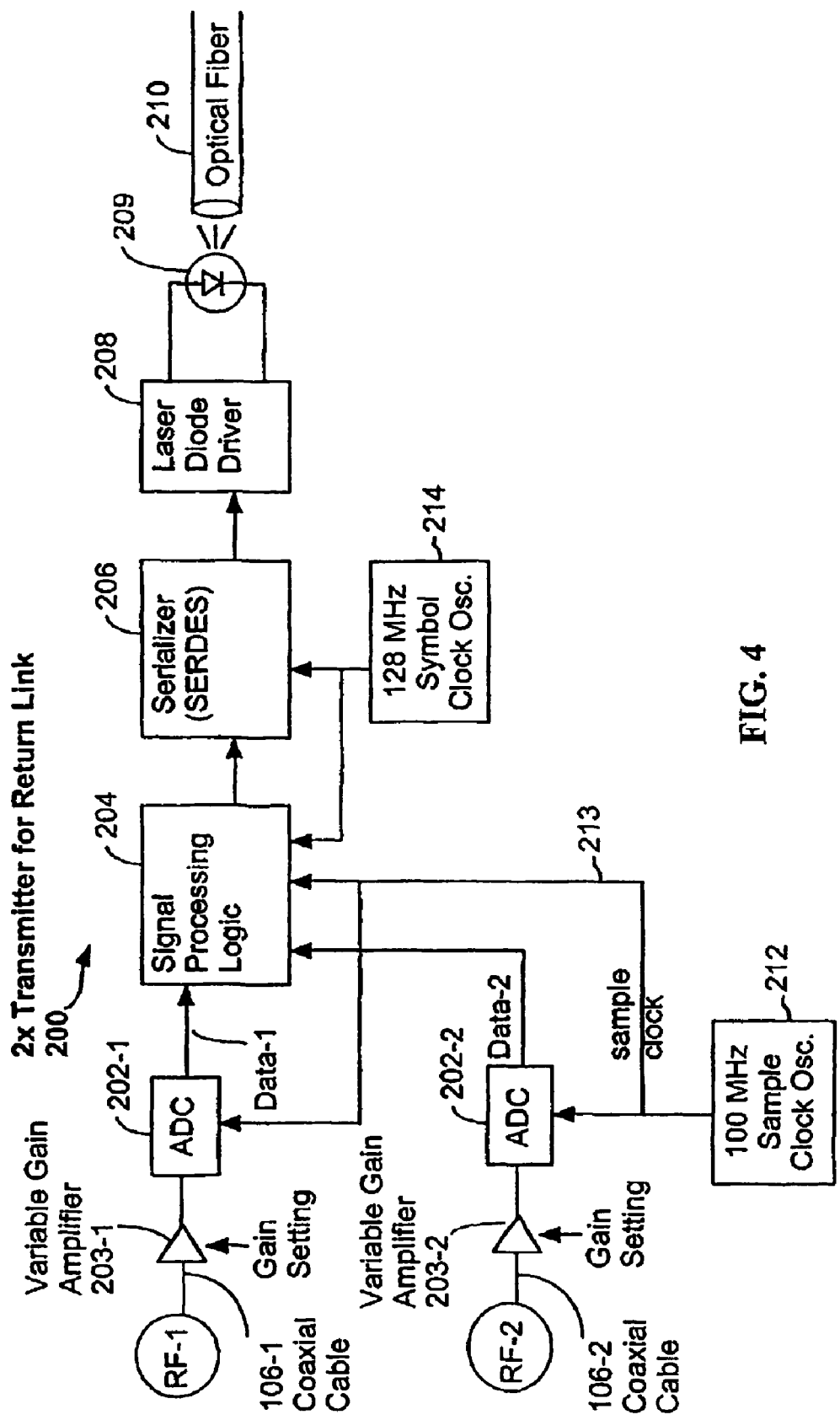
FIG. 4 is a block diagram of an exemplary RF channel transmitter of a digital return path link system in an exemplary implementation of the system.
Figure 5:
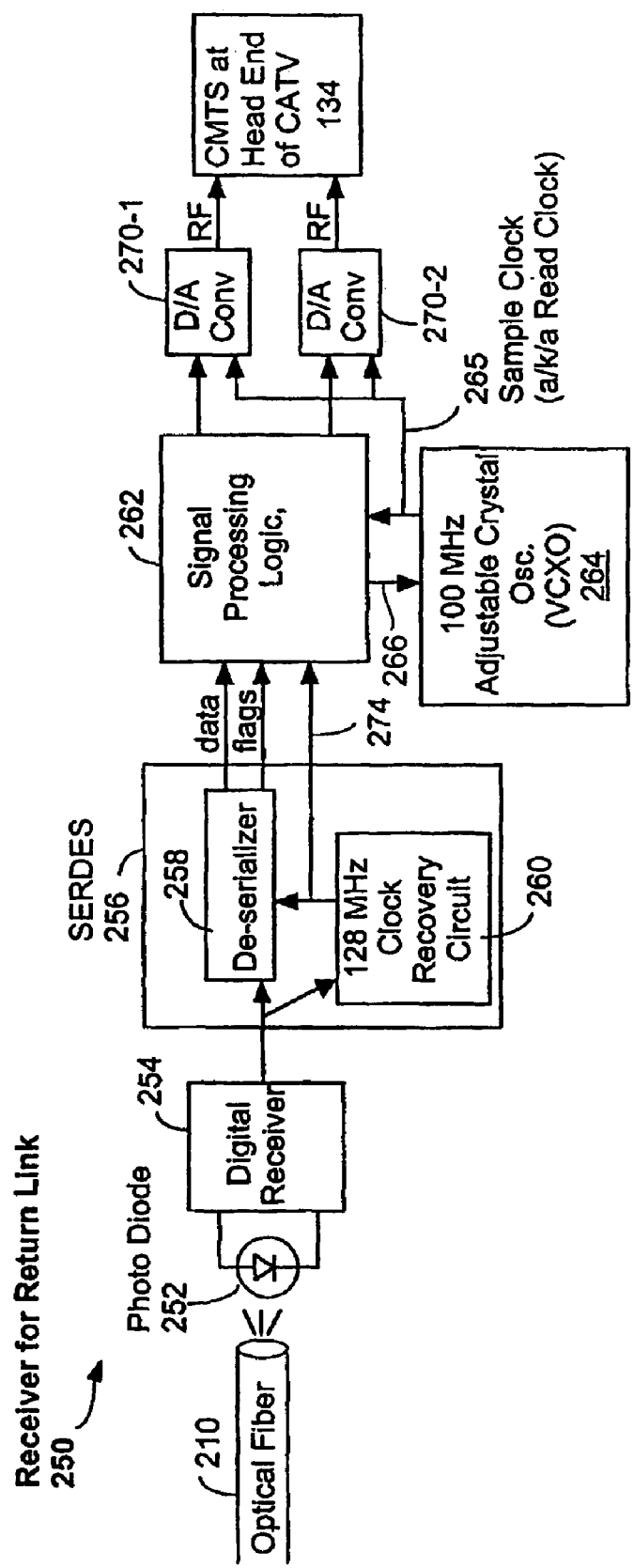
FIG. 5 is a block diagram of an exemplary RF channel receiver of a digital return path link system in an exemplary implementation of the system.
Figure 6:
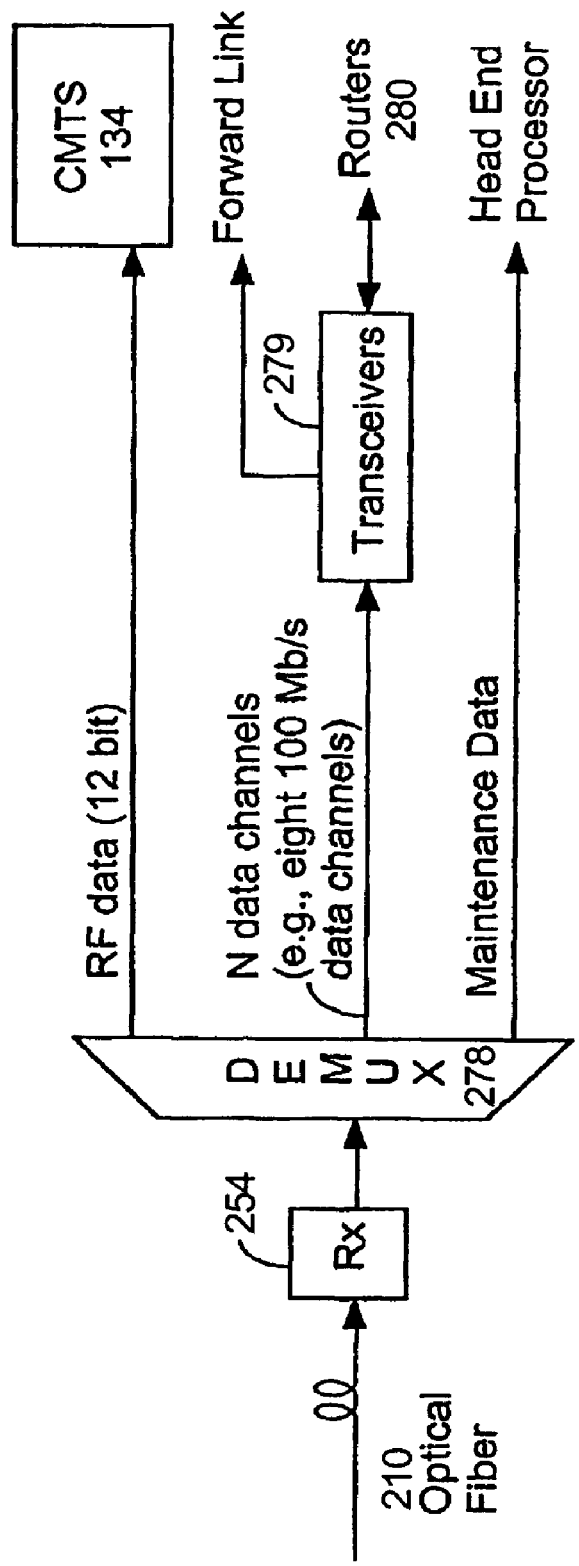
FIG. 6 is a block diagram a component of a cable hub for separating an RF data stream from a set of non-RF data streams at an exemplary cable hub.

As a preliminary matter, although the present invention relates to the exchange of Ethernet data over a return and forward path of a CATV network using a single master clock, the Ethernet data may piggyback at least in the return path with RF data that is more conventionally transmitted in the return path. Accordingly, to give suitable background for an understanding of one example environment presented in FIGS. 7 and 8, a general environment for returning RF data in a return path will be described with respect to FIGS. 4 through 6. The general environment described below with respect to FIGS. 4 through 6 is described in further detail in commonly-assigned, U.S. patent application Ser. No. 09/735,710 ('710 Patent Application), filed Dec. 12, 2000, entitled "SYSTEM AND METHOD FOR TRANSMITTING DATA ON RETURN PATH OF CABLE TELEVISION SYSTEM", the entire contents of which are incorporated herein by reference. The incorporated patent application will be hereinafter referred to as "REFERENCE 1".

FIG. 4 illustrates an example implementation of a dual RF channel transmitter 200 of a digital return path link of the present invention. In particular, the transmitter 200 is configured to receive two or more radio frequency (RF) signals from two or more corresponding coaxial cables 106-1, 106-2. As will also be detailed herein, the transmitter 200 is also configured to receive and transmit digital data, such as digital Ethernet data. In any case, each RF signal is processed by a corresponding variable gain amplifier 203-1, 203-2, and digitized by a pair of analog to digital converters (ADC) 202-1, 202-2. As discussed in more detail in the incorporated REFERENCE 1, the gain of each variable gain amplifier (e.g., 203-1, 203-2) is controlled via commands received from the head end of the system. These commands are received by a signal processing logic 204, which uses the commands to set the gain of the amplifiers 203, as well as to set the mode of other components of the transmitter 200.

One of ordinary skill in the art will appreciate after reading this specification and claims, that all clock rates, data structures and the like discussed herein are example values used in specific implementations. Clock rates, data structures and the like may vary widely from at least one implementation of the present invention to another, depending on the performance requirements required by the manufacturer, and so forth. Accordingly, while the present specification and claims refer primarily to one or more specific clock rates, such as 100 MHz, 125, MHz, 128 MHz, and so forth, one of ordinary skill will realize that a number of different clock rates may be utilized for sampling, desampling, and serializing. This is true so long as the implemented sampling and desampling clock rate (e.g., 100 MHz) is approximately the same in-frequency clock rate throughout the system.

Continuing with FIG. 4, the return path transmitter 200 further includes a sample clock oscillator 212 generating a 100 MHz sample clock signal 213. In at least one implementation, the oscillator 212 is preferably located directly next to one or both of the ADCs 202-1, 202-2. The sample clock oscillator 212 is used to time the digitizing of the incoming RF signals as they are received. Care is taken to ensure that the sample clock signal is not manipulated by any additional logic, since any such logic may increase jitter in the sample clock signal 213.

In at least one exemplary implementation, each ADC 202-1, 202-2 is a twelve-bit A/D converter manufactured by Analog Devices, each having a one volt differential input range, and clocked by the 100 MHz sample clock 212. Preferably, only ten bits of the twelve-bit output from the ADCs 202-1, 202-2 are used. Of course the particular ADC used and the number of data bits used will vary from one implementation of the invention to the next. The sampled outputs from ADCs 202-1, 202-2 are then passed through a signal-processing logic circuit 204 before being presented to a serializer-deserializer (SERDES) 206 (e.g., TLK-2500 from Texas Instruments).

The signal-processing logic circuit 204 processes the received RF signals, and outputs a sequence of data frames. In at least one implementation, each data frame can contain 80 bits of RF data; however the number of data bits per frame is a matter of design choice, which can vary in alternate embodiments. The ancillary data streams and processes for incorporating such are described in greater detail in the incorporated REFERENCE 1.

In another implementation, the signal-processing logic circuit 204 can generate ancillary data words to be inserted between data frames, and generate a frame control signal to indicate whether the output is part of a data frame, or a part of the ancillary data stream. Subsequently, the output of the signal-processing logic circuit 204 is serialized by the SERDES 206, which can perform an 8B/10B data conversion to produce a bit balanced data stream. The output of SERDES 206 is then transmitted by a digital transmitter 208, 209 down a return optical fiber 210 as a digitally modulated optical signal. For example, a 128 MHz symbol clock signal, generated by a symbol clock oscillator 214, can be multiplied by the SERDES circuit 206 to produce a 2.56 Gb/s clock signal. This serialized signal can then be sent to a laser diode driver 208 which causes the optical transmitter 209 to emit optical signals representing the serialized data on the optical fiber 210.

Figure 7:
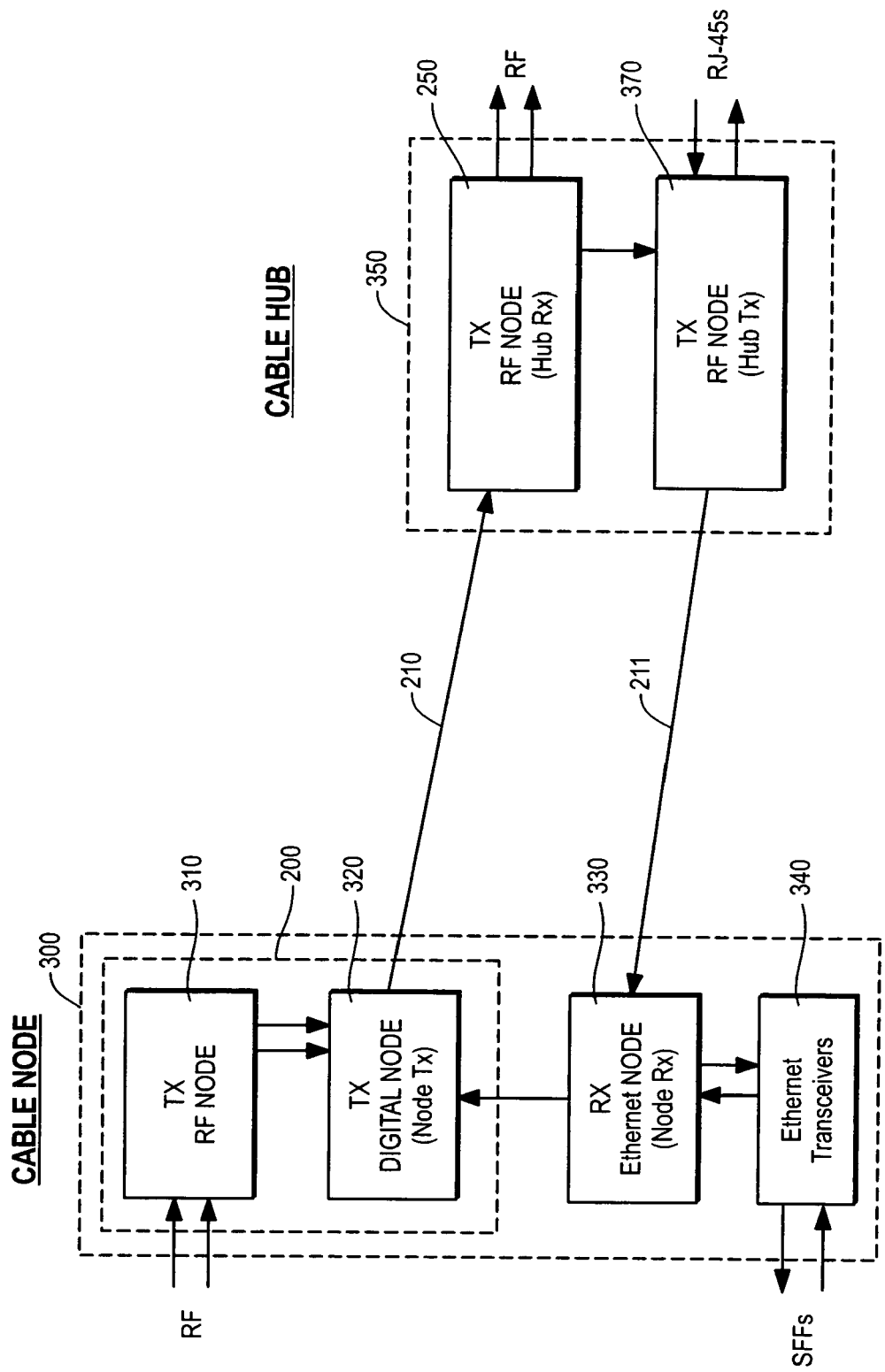
FIG. 7 shows an exemplary overview CATV network in which Ethernet data and RF data are transferred between a cable node and a cable hub, in accordance with an implementation of the present invention.
Figure 8:
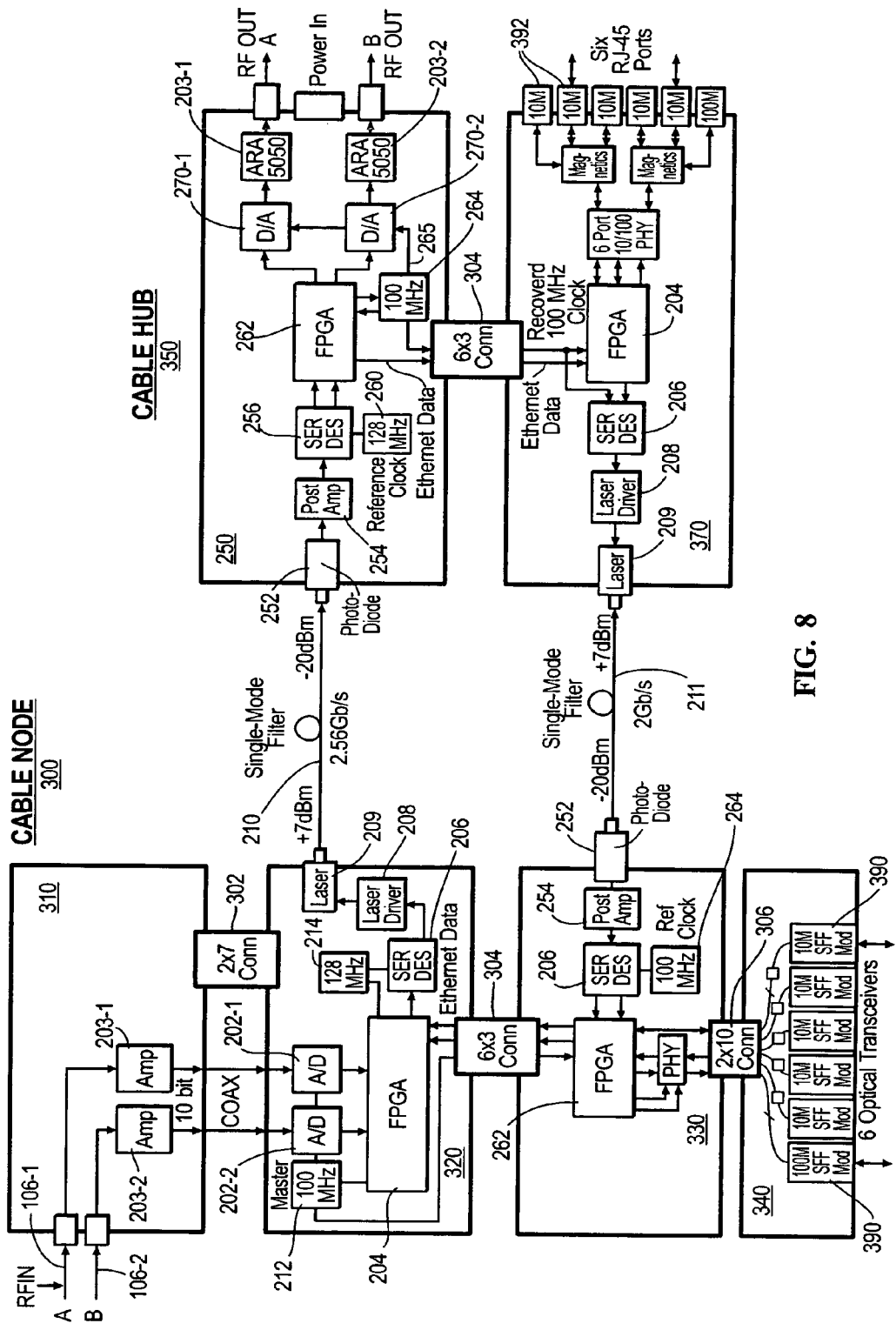
FIG. 8 shows a more particular overview of the network illustrated in FIG. 6, showing one or more of the components that can be used to transfer RF and Ethernet data over a CATV network using a single master clock.

FIG. 5 illustrates one or more of the components at the receiver component 250 of the optical fiber 210, such as at a cable hub 350 (see FIGS. 7 and 8). The receiver 250 at the receive end of the return optical fiber 210 includes a photodiode 252, and related receiver components 254 (e.g., a transimpedance amplifier, postamplifier, etc.), which change the optical 1 and 0 bits transmitted over the optical fiber 210 back into appropriate electrical 1 and 0 bits that can be read by subsequent electrical components.

The serial bit stream—received generally at the cable hub 350 (see FIGS. 7 and 8)—is sent to a deserializer circuit 258 of a serializer/deserializer (SERDES) component 256 (e.g., TLK-2500). In addition to a deserializer component 258, the SERDES circuit 256 can also include a clock recovery circuit 260 that recovers the 128 MHz symbol clock and the 100 MHz sample clock 265 from the incoming data. In at least one implementation, for example, the deserializer 258 converts the received data from twenty-bit words into sixteen-bit data words using either standard or proprietary 10B/8B or 20B/16B decoding.

The sixteen-bit data words can in turn be clocked, using the recovered symbol clock 260, and delivered into a receiver 250 signal processing logic circuit 262. In one implementation, the deserializer 258 further generates a set of flag signals, along with the decoded data values. The flag signals can indicate whether the current symbol is a data word, idle word, or carrier word. These flags are discussed more fully in the incorporated REFERENCE 1. Maintenance data words can also be identified by the signal processing logic 262. In at least one implementation, the receiver signal processing logic 262 is implemented using a field programmable gate array (FPGA), a QL4016 from QuickLogic, which can include one or more memory devices.

FIG. 5 also shows that, in at least one implementation, a VCXO (voltage controlled crystal oscillator) 264 can be used to generate a sample clock signal 265, also called the read clock, which is locked to the rate (e.g., 100 MHz) of the sample clock 213 of the transmitter 200. The VCXO 264 can be tuned to have a center frequency of 100 MHz, and to respond to the clock adjusting signal 266 by preferably varying its frequency by plus or minus 100 parts per million (i.e., from a low of 99.99 MHz to a high of 100.01 MHz).

Accordingly, the receiver 250 receives data from the optical fiber 210, recovers the symbol clock signal 274, and recovers an approximate in-frequency replicate 265 of the master sample clock signal 213. The receiver 250 identifies the digitized RF data streams, and sends the RF data samples to the D/A converters 270-1, 270-2. The D/A converters 270-1, 270-2 then desample the RF data streams back into analog form at the sample clock rate 265, and passes the now-analog RF data streams to the CMTS (cable modem termination system) 134. The CMTS 134 processes the RF signals, and determines the corresponding messages.

FIG. 6 shows a further embodiment of an example receiver 250 component of a cable hub 350, such as a hub 350 at the head end system. As described in FIG. 5, the receiver receives and converts the optical data stream from the fiber optic connection 210 at the receiver component 254. After desampling the converted data from the recovered clock rates, the cable hub 250 can separate the now-analog RF data stream, the non-RF data streams (e.g., Ethernet data), and maintenance data from each other. In at least one implementation, this can be done by passing the desampled data to a demultiplexer 278.

In at least one example implementation, the demultiplexer 278 can route the RF data stream to a CMTS 134 at the head end, route the non-RF data streams such as Ethernet data and maintenance data, onto other appropriate components as described further below with respect to FIGS. 7 and 8.

FIG. 7 provides a generic overview reference diagram of an example CATV system, in which components of a cable node 300 transfer data to and from components at a cable hub 350 using a common master clock rate signal. In particular, FIG. 7 shows that cable node 300 components can transfer a combination of one or more analog RF signals and one or more Ethernet signals to and from the cable hub 350. For example, one or more analog RF signals are received at the transmission RF node 310 ("RF Node").

The cable node 300 can also receive digital data signals, such as digital Ethernet signals from, for example, Ethernet transceivers at an Ethernet reception component 340. In one exemplary implementation, the Ethernet reception component 340 comprises one or more optical SFF transceiver ports, one or more RJ45 connector ports, and the like. By way of explanation, although frequent reference is made herein to Ethernet protocol digital data, one will appreciate that implementations of the present invention are also configurable for other types of data transmission protocols and configurations, such as Token ring, and the like.

Both the Ethernet data and the RF data are formatted and transmitted on the CATV return path 210 at the transmission digital node 320. The RF data is amplified at the RF node 310, and transferred to the Node Tx 320 where the analog RF data are sampled at the appropriate first clock rate. As used herein, the transmission RF node 310 and the transmission digital node 320 encapsulate at least some of the components of the transmitter 200, described in the preceding figures.

Continuing with FIG. 7, the Ethernet data is similarly formatted at the RX Ethernet node 330 at the appropriate first clock rate, and transmitted to the transmission digital node 320 of the transmitter 200. The Ethernet data and the sampled RF data are then combined, and transmitted from the transmission digital node 320 to the appropriate components of cable hub 350 over fiber optic cable 210. In one implementation, this is done by serializing the combined data stream at a second clock rate (e.g., 128 MHz) as a serialized data stream.

The cable hub 350 comprises a receiver component 250 that receives and decodes the combined data stream. The receiver component 250 Hub Rx 250 desamples the digitized RF data at an in-frequency approximation of the first clock rate, and passes the now-analog RF data on to, for example, the head end system 132. The transmission headend forward Ethernet (Hub Tx) component 370 passes on the Ethernet data to another component further on the return path, or receives additional Ethernet data to be sent on a forward path 211. If required, the Hub Tx component 370 passes any Ethernet data along the forward optical path 211 to the Ethernet node 330, where the Ethernet data can be sent back through the Ethernet transceiver component 340, or processed and passed back to the relevant components of the transmitter 200.

FIG. 8 illustrates additional details of an exemplary implementation for the components and functions described in FIG. 7, and illustrates how a single master clock controls the timing of data sampling in both the return and forward paths. The system provides a number of implementation details such as the types of components (e.g. SFF modules) and types of component connectors (e.g., connectors 302, 304, 306) that can be useful for practicing an exemplary implementation of the invention. One will appreciate, however, that the invention can be practiced using any number or type of suitable connectors, components, and modules within the inventive context. This is true so long as the components and connectors help facilitate the cable node 300 and/or cable hub 350 configured to sample, desample, and, in some cases, serialize/deserialize data streams at a single master clock rate.

Thus, for example, FIG. 8 shows that one or more analog RF signals are received via cables-in 106-1 and 106-1 to the cable node 300 at transmission RF node 310. The analog RF signals are first amplified at corresponding signal amplifiers 203-1 and 203-2. In at least one exemplary implementation, the signal amplifiers are an ARA05050 amplifier manufactured by ANADIGICS. After the analog RF signals have been amplified, the analog RF signals are transferred via, for example, coaxial cable to A/D (analog to digital) converters 202-1 and 202-2 at the transmission digital node 320.

A similar process occurs with received Ethernet data from the Ethernet transceiver module 340. For example, an Ethernet transceiver module 340 can comprise any number of digital connection interfaces such as RJ45 ports, LC connectors at small form factor optical ports (SFF) 390, and so on. These ports and connectors can provide bi-directional communication to users or devices that may need to directly connect to the cable node 300 through a digital interface. In any case, the digital data received from these ports is transferred via a digital protocol, such as the Ethernet transfer protocol, to the receiving Ethernet node 330 for further processing.

A master clock 212 provides the appropriate sampling clock rate to the A/D converters at the transmission RF node 310, and to processor/memory modules at the transmission RF node 310 and the receiving Ethernet node 330. In at least one implementation, the processor/memory modules 262 and 204 are Field Programmable Gate Arrays (FPGA). Thus, for example, if the master clock 212 instructs a sampling frequency of 100 MHz, the analog RF data are sampled at 100 MHz at the A/D converters 202-1 and 202-2. Similarly, the Ethernet data would be processed at the processor/memory module 262 in the receiving Ethernet node 330, and would be sent to the FPGA 204 at the transmission digital node 320 at a frequency of 100 MHz. By way of explanation, the term "processor/memory module" is sometimes also herein referred to generically as "signal processing logic". Furthermore, the signal processing logic is sometimes also referred to herein as a Field Programmable Gate Array.

Accordingly, since the Ethernet data signals and the digitized RF data signals are at the same frequency (dictated by the master clock 212), the FPGA 204 can combine the data signals into a single data stream to be sent to a cable hub 350.

In one exemplary implementation, this involves serializing 206 the combined Ethernet and digitized RF data at a second clock rate, such as a 128 MHz clock rate from a symbol clock oscillator 214. The serialization step at the second clock rate, however, is an implementation detail that may not be necessary in all instances. In any case, the combined data stream is converted from electrical 1 and 0 bits to optical 1 and 0 bits via the laser driver 208 and laser 209. As previously described herein, the laser 209 transmits the optical signal onto the return pathway via the fiber optic cable 210.

A photoreceptor 252 at the Hub Rx 250 receives the optical signals and converts the signals to a small electrical current that is then brought to an appropriate voltage by a component such as a postamplifier 254 or transimpedance amplifier, etc. In electrical form, the combined data stream can now be processed by the other components at the cable hub 350. For example, if the data stream were serialized at the second symbol clock rate by the symbol clock 214, the second clock rate would first be recovered from the data stream and compared with the reference clock 260. The data stream would then be deserialized at approximately the same second clock rate (e.g., 128 MHz if serialized at 128 MHz), which was recovered from the data stream and compared with a reference clock 260. The data are then processed by signal processing logic at, for example, an FPGA 262.

Instructions at the FPGA 262, when executed, cause the digitized RF data and the digital Ethernet data to be separated and processed along different pathways. In addition, the FPGA 262 generates and asserts a control voltage on the Voltage Controlled Oscillator (VCXO) 264 to thereby cause the VCXO 264 to generate an approximate replicate of the first clock rate provided by the master clock 212. This signal is referred to in the drawings as a "Recovered 100 MHz Clock" or "Recovered Clock". The recovered clock is then used to desample the digitized RF data streams at corresponding digital-to-analog (D/A) converters 270-1, and 270-2.

Although the recovered first clock rate may or may not be in the same phase as the first clock rate provided by the master clock 212, the recovered first clock rate is sufficiently useful for desampling since it is close to or identical to the same frequency as the original first clock rate. That is, the recovered first clock rate is an approximate in-frequency replicate of the master clock 212 rate signal 213. The converted, now-analog RF data can then be sent onto to the head end system 132.

Similarly, the Ethernet data streams are sent to an FPGA 204 at the Hub Tx 370 for further processing. For example, at least some of the received digital Ethernet data from the data stream may be sent back out to users or devices connected through corresponding reception optical ports (e.g., SFF ports) or electrical ports (e.g., RJ45 ports) 392. Alternatively, some of the digital Ethernet data may be operated upon at the FPGA 204, based on control instructions sent from the head end 132 or in accordance with default settings of the FPGA 204 at the Hub Tx 370.

In some embodiments of the present invention, for example, Ethernet data can represent commands sent by the head end system 132, or by an intermediary hub, where the commands are meant to control the operation of components, e.g., components 310, 320, 330, and 340 in the CATV system. The need for head end control of the various components potentially applies to all the embodiments described above. For instance, the commands sent by the head end system 132 are received by an FPGA 204 at component 320, which uses the commands to set the gain of the amplifiers 203-1 and 203-1, as well as to set the mode of other components of the transmitter 200. Processes, methods, and diagrams for sending control signals within the return and forward paths of the exemplary CATV system are described in greater detail in the commonly-assigned REFERENCE 1, incorporated by reference herein.

In any case, new Ethernet data can be sent back on the forward optical cable 211. In some cases, new Ethernet data comprises other received Ethernet data that has been received through the reception ports 392, and can also comprise the other received Ethernet data combined with a portion of the Ethernet data extracted from the combined data stream sent over the return path 210. Whatever Ethernet data remains to be transmitted along the forward path 211 can then be serialized by the SERDES module 206, and converted and transmitted by the laser driver 208 and laser 209 onto the forward optical cable 211. In at least one implementation, the Ethernet data can be serialized using the recovered approximate replicate of the master clock 212 rate signal 313 which is sent by the VXCO 264 to the hub Tx 370 over the connector 304.

Ethernet data sent from the cable hub 350 to the Ethernet node 330 of the cable node 300 are received in a similar process as with the combined data received at the Hub Rx 250. For example, a photodiode 252 identifies the optical 0 and 1 bits from the forward optical cable 211 and converts the Ethernet data into a relatively low current that is read by the postamp 254. The postamp 254 in the Ethernet node 330, as with Hub Rx 250, converts the current to a larger voltage that can be read by the components at the Ethernet node 330. Furthermore, the serialization clock signal, which is an approximate in-frequency replicate of the master clock 212 signal 213, is recovered at SERDES 206 and compared to the reference clock 264. The SERDES 206 component then deserializes the data stream based on the recovered replicate of the master clock 212 signal 213, and sends the data Ethernet data to FPGA 262 for subsequent processing. For example, some of the deserialized Ethernet data may be sent back out to users or devices connected to the Ethernet transceiver component 340 at ports 390. Alternatively, the Ethernet data may be processed and sent to the transmission digital node 320 to be subsequently combined with other digitized RF signals, and so forth.

Synchronizing of all of the return path clocks to a single frequency reference in this manner allows simpler digital aggregation of multiple streams, in at least some exemplary implementations, because the data from each stream is coherent with the others. For example, two return path data streams can be combined by simple addition of the data. This is the same as performing an RF combination, but it does not require that the signals be taken from the digital domain back to analog. This method of combination may be performed at a node where two or more subscriber signals are sent, at an intermediate point in the CATV system such as a Hub, or can be performed at the head end before the signals are processed by a CMTS at the head end system.

In any case, the methods are the same, and the ability to perform this function digitally means that no additional losses in signal integrity beyond what would happen from theoretical arguments (i.e. normal signal to noise degradation) will occur. Because it is possible to design the CATV system using digital returns with SNR levels that cannot be obtained using analog fiber optic methods, it is therefore possible to start with signals that are clean enough that significant levels of digital combining can be performed. This enables the system to meet other objectives, such as cost reduction and signal grooming under changing system loads.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The invention claimed is:

1. In a cable distribution network environment that includes a cable hub and a cable node, a method for synchronizing data transfers over both a return path and a forward path using a single master clock, the method comprising the following:
   an act of the cable node using a master clock to sample RF data and combine the RF data with Ethernet data;
   an act of the cable node transmitting the combined RF data and Ethernet data along with master clock information to the cable hub in a data stream over a subscriber to head end return path;
   an act of the cable hub recovering the master clock information from the data stream to acquire an approximate in-frequency replicate signal of the master clock;
   an act of the cable hub using the replicated master clock signal to desample the RF data; and
   an act of the cable hub receiving Ethernet data in a parallel format and using the replicated master clock signal to convert the parallel Ethernet data to serialized Ethernet data;
   an act of the cable hub transmitting the serialized Ethernet data along a head end to subscriber forward path.

2. The method as recited in claim 1, wherein the replicated master clock signal is sent with the Ethernet data along the forward path, and wherein the replicated master clock signal is used to deserialize the serialized Ethernet data at the cable node.

3. The method as recited in claim 1, wherein the master clock has a first clock rate, wherein the combined RF data, Ethernet data, and clock information are serialized at a second clock rate prior to being transmitted to the cable hub.

4. The method as recited in claim 1, wherein the recovered replicate signal is used to convert the parallel Ethernet data to the stream of serialized Ethernet data prior to transmitting the serialized Ethernet data to the cable node.

5. The method as recited in claim 1, wherein the act of the cable node using the master clock to sample RF data and combine the RF data with Ethernet data includes providing the master clock to Ethernet signal processing logic and to analog to digital converters used to sample the RF data.

6. The method as recited in claim 1, wherein the cable hub receives the Ethernet data from a plurality of Ethernet reception ports at the cable hub and/or from the data stream of combined RF data and Ethernet data transmitted by the cable node.

7. The method as recited in claim 3, further comprising an act of recovering the second clock rate from the transmitted data stream.

8. The method as recited in claim 7, further comprising an act of deserializing the combined RF data, Ethernet data, and clock information at the recovered second clock rate after arriving at the cable hub.

9. The method as recited in claim 4, wherein the replicate signal is used to deserialize the serialized Ethernet data at the cable node, the serialized Ethernet data being received from the cable hub.

10. In a cable distribution network environment in which RF data and Ethernet data are transmitted between two points of return and forward optical cables, a cable node including one or more components having executable instructions stored thereon, that, when executed, perform a method comprising the following:
   an act of using a master clock to sample RF data and combine the RF data with Ethernet data;
   an act of transmitting the combined RF data and Ethernet data along with master clock information to the cable hub in a data stream over a subscriber to head end return path;
   an act of receiving Ethernet data from the cable hub along a head end to subscriber forward optical cable, wherein the Ethernet data comprises data that has been converted from a parallel format to a serialized Ethernet data stream using the master clock signal; and
   an act of recovering an approximate replicate of the master clock signal from the received Ethernet data stream.

11. The cable node as recited in claim 10, wherein at least one of the one or more components having executable instructions stored thereon is a field programmable gate array.

12. The cable node as recited in claim 10, wherein the act of recovering an approximate in-frequency replicate of a master clock signal from the serialized Ethernet data stream further comprises an act of comparing the recovered replicate of the master clock signal to a reference clock.

13. The cable node as recited in claim 10, wherein the cable node comprises one or more digital interface ports, such that the cable node can be accessed through the one or more digital interface ports by a connection that is different from the cable node connection to the forward optical cable.

14. The cable node as recited in claim 10, wherein the method further comprises an act of serializing the combined RF data and Ethernet data along with master clock information as a data stream at a second clock rate prior to transmitting the combined data to the cable hub.

15. The cable node as recited in claim 10, wherein the method further comprises an act of deserializing the Ethernet data stream using the approximate replicate of the master clock signal.

16. In a cable distribution network environment in which RF data and Ethernet data are transmitted between two points separated by return and forward optical cables, a cable hub including one or more components having executable instructions stored thereon, that, when executed, perform a method comprising the following:
   an act of receiving a combined data stream sent from a cable node over a subscriber to head end return optical cable, wherein the combined data stream includes one or more digitized RF data signals, and one or more non-RF data signals;
   an act of recovering an approximate in-frequency replicate of a master clock signal from the combined data stream;
   an act of desampling the RF data based on the recovered replicate of the master clock signal; and
   an act of using the recovered replicate of the master clock signal to serialize at least a portion of the non-RF data signals extracted from the combined data stream by converting the at least a portion of the non-RF data signals from a parallel format to a serial format.

17. The cable hub as recited in claim 16, wherein at least one of the one or more components having executable instructions stored thereon is a field programmable gate array.

18. The cable hub as recited in claim 16, further comprising an act of including the recovered master clock signal in the serialized non-RF data stream and transmitting the serialized non-RF data signals to the cable node on the forward optical cable.

19. The cable hub as recited in claim 16, wherein the act of recovering an approximate in-frequency replicate of a master clock signal further comprises an act of comparing the recovered replicate of the master clock signal to a reference clock.

20. The cable hub as recited in claim 16, wherein the non-RF data signals comprise Ethernet data signals received by virtue of one or more data transmissions through one or more corresponding digital interface ports at the cable node.

21. The cable hub as recited in claim 16, wherein the non-RF data signals comprise Ethernet data signals received from one or more Ethernet ports at the cable hub.

22. The cable hub as recited in claim 21, wherein the method further comprises an act of combining one or more Ethernet data signals received from one or more Ethernet ports at the cable hub with at least a portion of the extracted non-RF data signals.

* * * * *